United States Patent
Valente

(10) Patent No.: US 7,611,437 B2
(45) Date of Patent: Nov. 3, 2009

(54) SPACER PIN ARRANGEMENT FOR HELICAL GEAR DIFFERENTIAL

(75) Inventor: Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 281 days.

(21) Appl. No.: 11/732,475

(22) Filed: Apr. 3, 2007

(65) Prior Publication Data

US 2007/0191170 A1 Aug. 16, 2007

Related U.S. Application Data

(63) Continuation-in-part of application No. 11/584,389, filed on Oct. 20, 2006, now Pat. No. 7,232,399, which is a continuation of application No. 11/343,855, filed on Jan. 31, 2006, now Pat. No. 7,147,585, which is a continuation of application No. 10/794,780, filed on Mar. 5, 2004, now Pat. No. 7,022,041.

(51) Int. Cl.
*F16H 3/74* (2006.01)

(52) U.S. Cl. ...................................... 475/252; 475/248

(58) Field of Classification Search ................ 475/230, 475/248, 249, 252; 74/606 R, 607
See application file for complete search history.

(56) References Cited

U.S. PATENT DOCUMENTS

| | | | |
|---|---|---|---|
| 2,269,734 A | 1/1942 | Powell | |
| 3,706,239 A | 12/1972 | Myers | |
| 4,365,524 A | 12/1982 | Dissett | |
| 4,677,876 A | 7/1987 | Dissett | |
| 4,751,853 A | 6/1988 | Dissett | |
| 5,055,096 A | 10/1991 | Riemscheid et al. | |
| 5,122,101 A | 6/1992 | Tseng | |
| 5,122,102 A | 6/1992 | Chludek et al. | |
| 5,139,467 A | 8/1992 | Carpenter | |
| 5,221,238 A | 6/1993 | Bawks et al. | |
| 5,292,291 A | 3/1994 | Ostertag | |
| 5,342,256 A | 8/1994 | Amborn et al. | |
| 5,389,048 A | 2/1995 | Carlson | |
| 5,492,510 A | 2/1996 | Bowerman | |
| 5,554,081 A | 9/1996 | Bowerman | |
| 5,671,640 A | 9/1997 | Valente | |
| 5,823,907 A | 10/1998 | Teraoka et al. | |
| 5,842,946 A | 12/1998 | Ichiki | |
| 5,951,431 A | 9/1999 | Downs et al. | |
| 5,983,754 A | 11/1999 | Tyson et al. | |
| 5,984,823 A | 11/1999 | Gage | |
| 6,053,838 A | 4/2000 | Gage | |
| 6,139,462 A | 10/2000 | Gage et al. | |
| 6,533,697 B2 | 3/2003 | Morse et al. | |
| 6,540,640 B2 | 4/2003 | Hibbler et al. | |
| 2002/0025878 A1 | 2/2002 | Kam | |

FOREIGN PATENT DOCUMENTS

| | | |
|---|---|---|
| DE | 4023332 A1 | 7/1990 |
| EP | 356401 A2 | 2/1990 |
| GB | 2212231 | 11/1987 |
| JP | 2000110920 | 4/2000 |

*Primary Examiner*—David D. Le
(74) *Attorney, Agent, or Firm*—Harness, Dickey & Pierce, P.L.C.

(57) ABSTRACT

An axle assembly that includes a differential case which is rotatable about an axis, a pair of side gears that are disposed within the differential case, a spacer ring and a cross pin. The spacer ring is disposed between the side gears. The cross pin is fixed to one of the differential case and the spacer ring and extends through the spacer ring. The aperture in the spacer that receives the cross pin may be larger than the cross pin so that the spacer ring can control end play of the side gears independently of the cross pin.

8 Claims, 13 Drawing Sheets

SPACER PIN ARRANGEMENT FOR HELICAL GEAR DIFFERENTIAL

CROSS-REFERENCE TO RELATED APPLICATIONS

This is a continuation-in-part of U.S. patent application Ser. No. 11/584,389 filed Oct. 20, 2006, which is a continuation of U.S. patent application Ser. No. 11/343,855 filed Jan. 31, 2006, now U.S. Pat. No. 7,147,585 which is a continuation of U.S. patent application Ser. No. 10/794,780 filed Mar. 5, 2004, now U.S. Pat. No. 7,022,041. The disclosures of the above applications are incorporated herein by reference.

FIELD OF THE DISCLOSURE

The present disclosure relates to differentials for use in automotive drivelines and, more particularly, to a spacer pin assembly for use in C-clip parallel-axis helical differentials which functions to provide independent control of side gear endplay and axleshaft endplay.

BACKGROUND OF THE DISCLOSURE

Differentials of the type used in automotive drivelines generally include a planetary gearset supported within a differential case to facilitate relative rotation (i.e., speed differentiation) between a pair of output shafts. In some differential, the planetary gearset includes helical side gears fixed to the ends of the output shafts and which are meshed with paired sets of helical pinion gears. This type of differential is known as a parallel-axis helical differential. In response to input torque applied to the differential case, the torque transmitted through meshed engagement of the side gears and pinion gears generates thrust forces. To accommodate these and other operating forces, the wall surface of the gear pockets and other thrust surfaces of the differential case must provide adequate support.

In some differentials, it is necessary to install C-shaped retainers, or C-clips, for restraining and positioning the output shafts in the differential. To install the C-clips, it is necessary to gain access to the interior cavity of the differential case through an access window. In general, it is desirable to allow the side gear thrust load to be distributed evenly around the periphery of the differential. One way to achieve such even load distribution is to position the pinion pairs evenly around the periphery of the differential case. However, because the access window is provided in the differential case, there tends to be incompatibility issues with placement of the pinion pairs.

SUMMARY OF THE DISCLOSURE

In one form, the present invention provides an axle assembly for a vehicle that includes a pair of axleshafts and a differential assembly having differential case, a pair of side gears, and a spacer pin assembly. The differential case is rotatable about an axis and includes a first pin aperture. The side gears are rotatably disposed within the differential case. Each axleshaft is coupled for rotation with one of the side gears. The spacer pin assembly includes a spacer that is disposed between the side gears and which has a second pin aperture. A cross pin is received in the first and second pin apertures such that receipt of the cross pin in the first pin aperture fixedly but removably couples the cross pin to the differential case. The size of the second pin aperture formed in the spacer is greater than a corresponding size of the cross pin such that the spacer is axially moveable along the rotational axis of the differential case relative to the cross pin. As such, the cross pin functions to limit lateral movement of the axleshafts in a direction toward one another while the spacer functions to limit movement of the side gears toward one another independently of the cross pin.

In another form, the present invention provides a method that includes: providing a differential case having a rotational axis; installing a pair of side gears within the differential case; installing a pair of axleshafts within the differential case such that each axleshaft is coupled for rotation with one of the side gears; locating a spacer between the side gears; fixedly coupling a cross pin to the differential case such that the cross pin is inserted through a pin aperture in the spacer; and moving the side gears and the spacer in a first direction along the rotational axis without moving the cross pin.

In yet another form, the present invention provides an axle assembly for a vehicle that includes a pair of axleshafts and a differential assembly having a differential case, a pair of side gears, and a spacer pin assembly. The differential case is rotatable about an axis and includes a first pin aperture. The side gears are rotatably disposed within the differential case. Each axleshaft is coupled for rotation with one of the side gears. The spacer pin assembly includes a spacer that is disposed between the side gears and includes a second pin aperture. A cross pin is received in the first and second pin apertures. Receipt of the cross pin in the first pin aperture fixedly but removably couples the cross pin to the differential case. The size of the second pin aperture is greater than a corresponding size of the cross pin such that a void space is disposed between the spacer and the cross pin regardless of the axial position of the side gears along the rotational axis.

In accordance with yet another form, the present invention provides an axle assembly for a vehicle that includes a pair of axleshafts and a differential assembly having a differential case, a pair of side gears, and a spacer pin assembly. The differential case is rotatable about an axis and includes a case pin aperture. The side gears are rotatably disposed within the differential case. Each axleshaft is coupled for rotation with one of the side gears. The spacer pin assembly includes a spacer ring that is disposed between the side gears and includes first and second spacer pin apertures. A cross pin is inserted into the differential case through the case pin aperture and is retained within the first and second spacer pin apertures in the spacer ring. Thereafter, the cross pin is secured to the differential case for removeably coupling the spacer pin assembly to the differential case.

In accordance with another embodiment of the present invention, the differential assembly includes a pair of side gears rotatably disposed in the differential case and a spacer pin assembly disposed between the side gears. The spacer pin assembly includes a spacer ring non-rotatably retained within the differential case and a cross pin having its opposite ends retained in apertures formed in the spacer ring. The cross pin is removeably secured to the spacer ring.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2b is a perspective view of the differential case associated with the differential assembly of FIG. 2a;

FIG. 3 is an exploded view of the differential assembly shown in FIG. 2a;

FIG. 4 is a sectional view of the differential assembly taken along line 4-4 of FIG. 2a;

DETAILED DESCRIPTION OF THE PREFERRED EMBODIMENTS

The following description of the preferred embodiments is merely exemplary in nature and is in no way intended to limit the disclosure, its application, or uses. The differential assembly according to the present teachings may be utilized with a wide variety of applications and is not intended to be specifically limited to the particular application recited herein.

Figure 1:
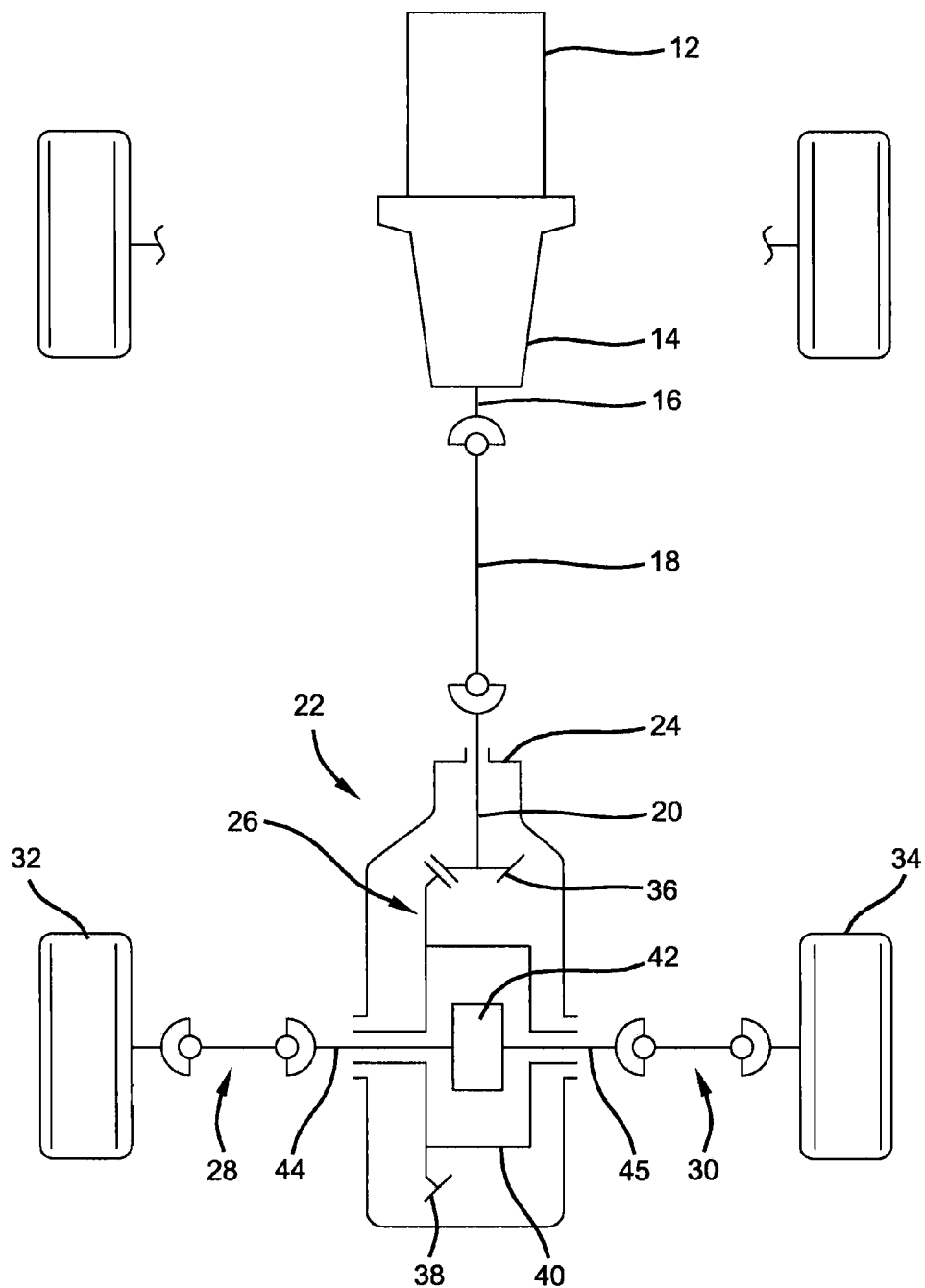
FIG. 1 is a schematic view of an exemplary motor vehicle into which a differential assembly constructed in accordance with the teachings of the present disclosure is incorporated.

With initial reference to FIG. 1, a drivetrain 10 for an exemplary motor vehicle is shown to include an engine 12, a transmission 14 having an output shaft 16, and a propeller shaft 18 connecting output shaft 16 to a pinion shaft 20 of a rear axle assembly 22. Rear axle assembly 22 includes an axle housing 24, a differential assembly 26 rotatably supported in axle housing 24, and a pair of axleshaft assemblies 28 and 30, respectively, interconnected to left and right rear wheels 32 and 34, respectively. Pinion shaft 20 has a pinion gear 36 fixed thereto which drives a ring gear 38 that is fixed to a differential case 40 of differential assembly 26. Differential case 40 is rotatably supported in axle housing 24. A gearset 42 supported within differential case 40 transfers rotary power from case 40 to a pair of output shafts 44 and 45 associated with axleshaft assemblies 28 and 30, respectively, and facilitates relative rotation (i.e., differentiation) therebetween. While differential assembly 26 is shown in a rear-wheel drive application, the present invention is contemplated for use in differential assemblies installed in transaxles for use in front-wheel drive vehicles, and/or in transfer cases for use in four-wheel drive vehicles.

Turning now to FIGS. 2a through 5, differential assembly 26 will be described in further detail. Differential assembly 26 is a parallel-axis helical-gear type differential and includes differential case 40 which defines an internal chamber 48. Differential case 40 includes a main drum or body 46 and an end cap 50, each of which having respective mating radial flanges 52 and 54, respectively. Radial flanges 52 and 54 are secured together by a plurality of bolts (not shown) extending through aligned mounting bores 58. As is known, a ring or bevel gear, such as ring gear 38, can be fixed to radial flange 52 on differential case 40 to transfer rotary power (i.e., drive torque) thereto. Differential case 40 defines a pair of axially aligned openings 60a and 60b in communication with internal chamber 48. Axially aligned openings 60a and 60b are adapted to receive and rotatably support end segments of output shafts 44 and 45 which are coupled to or integrally formed with axleshafts 28 and 30.

Figure 3:
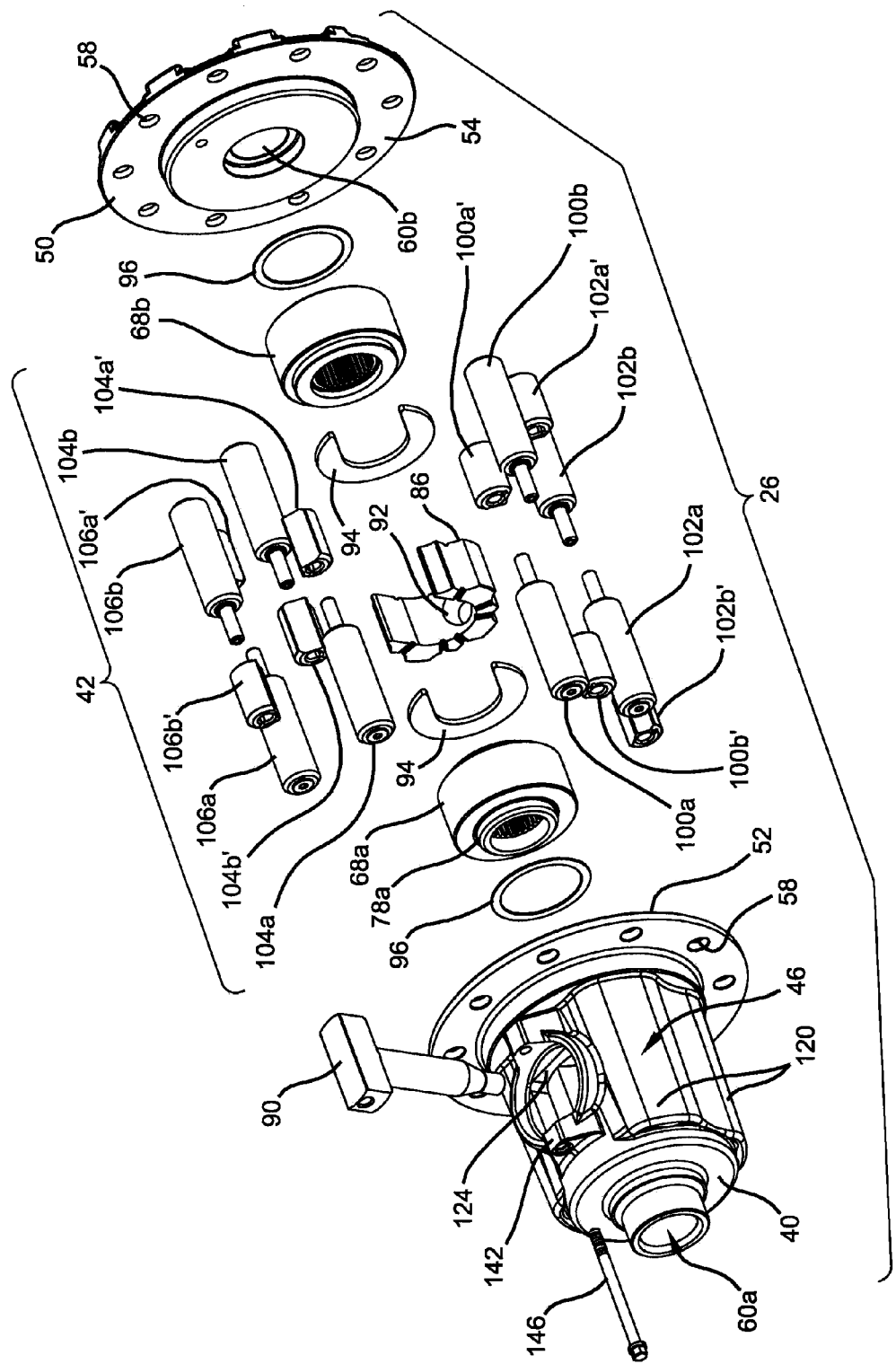
Figure 4:
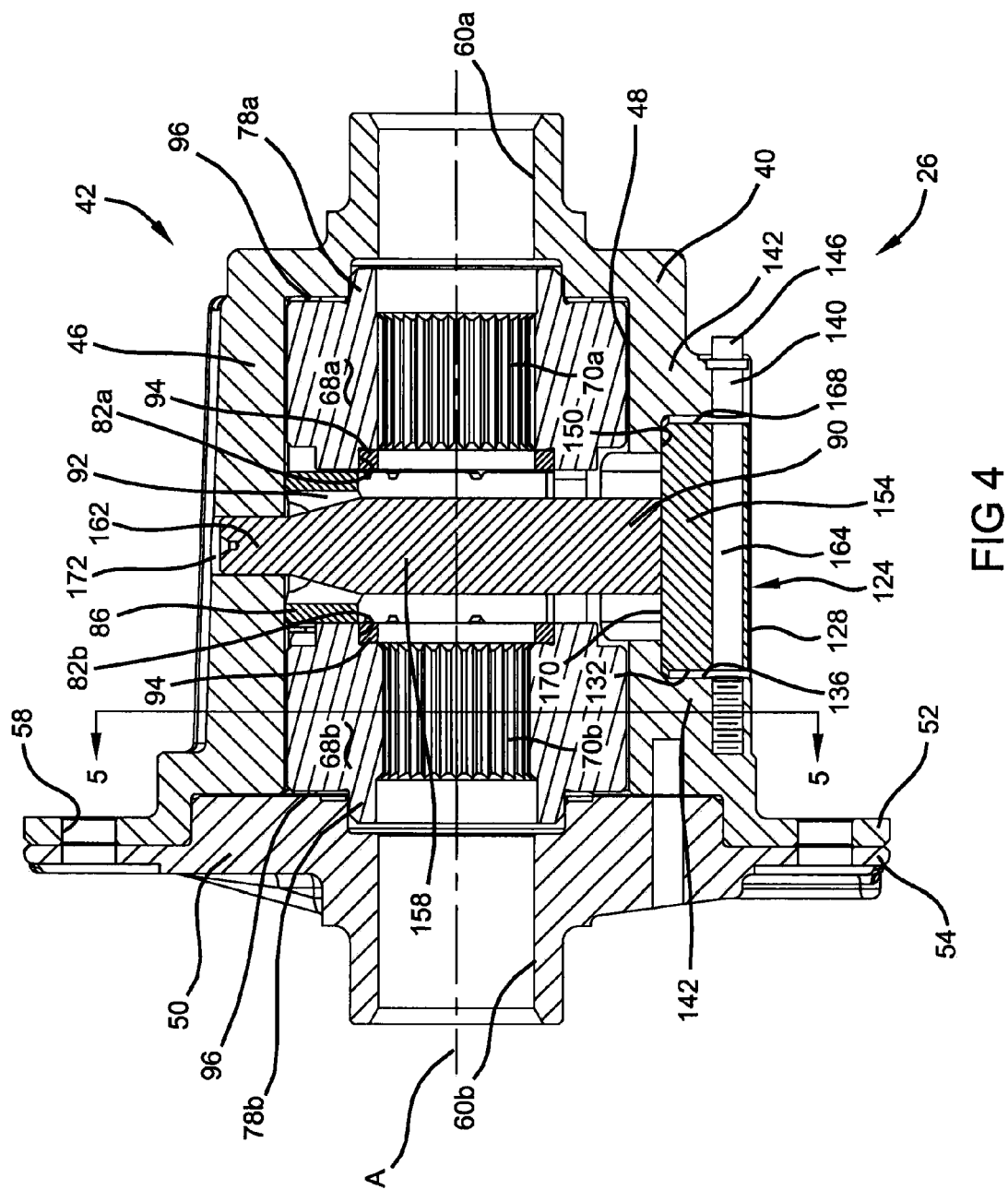

With specific reference to FIGS. 3 and 4, differential assembly 26 includes gearset 42 for transferring drive torque from differential case 40 to output shafts 44 and 45 in a manner that facilitates speed differential therebetween. Gearset 42 may be a helical-type and is disposed within internal chamber 48. Gearset 42 includes a pair of side gears 68a and 68b. Side gears 68a and 68b have internal splines 70a and 70b adapted to mesh with external splines, not specifically shown, on the corresponding end segments of output shafts 44 and 45. In addition, side gears 68a and 68b include axial hubs 78a and 78b, respectively, which are retained in corresponding annular sockets formed in main body 46 and end cap 50 of differential case 40. Side gears 68a and 68b also are formed to define annular chambers 82a and 82b. As will be described in greater detail below, a spacer 86 of a spacer pin assembly is located between side gears 68a and 68b for limiting the amount of axial endplay of side gears 68a and 68b within differential case 40. The spacer pin assembly further includes a cross pin 90 which extends through a clearance aperture 92 in U-shaped spacer 86 and functions to control endplay of axleshafts 44 and 45.

C-shaped retainers, commonly referred to as C-clips 94, are retained in annular chambers 82a and 82b and retention grooves formed in the end segments of axleshafts 44 and 45 for preventing axleshafts 44 and 45 from becoming unintentionally disengaged with side gears 68a and 68b. As such, C-clips 94 function to releaseably couple axleshafts 44 and 45 to differential assembly 26. Side gears 68a and 68b may be bounded at their outer ends by washers 96.

Gearset 42 is shown to also include four sets of helical pinion pairs, 100a and 100b, 102a and 102b, 104a and 104b, and 106a and 106b, respectively (FIG. 3). For clarity, pinion pairs 100a and 100b, 102a and 102b, 104a and 104b and 106a and 106b are hereinafter referred to as a first, second, third and fourth pairs of pinion gears 100, 102, 104 and 106, respectively. Brake shoes 100a' through 106b' cooperate with respective pinion gears 100 through 106.

Figure 2A:
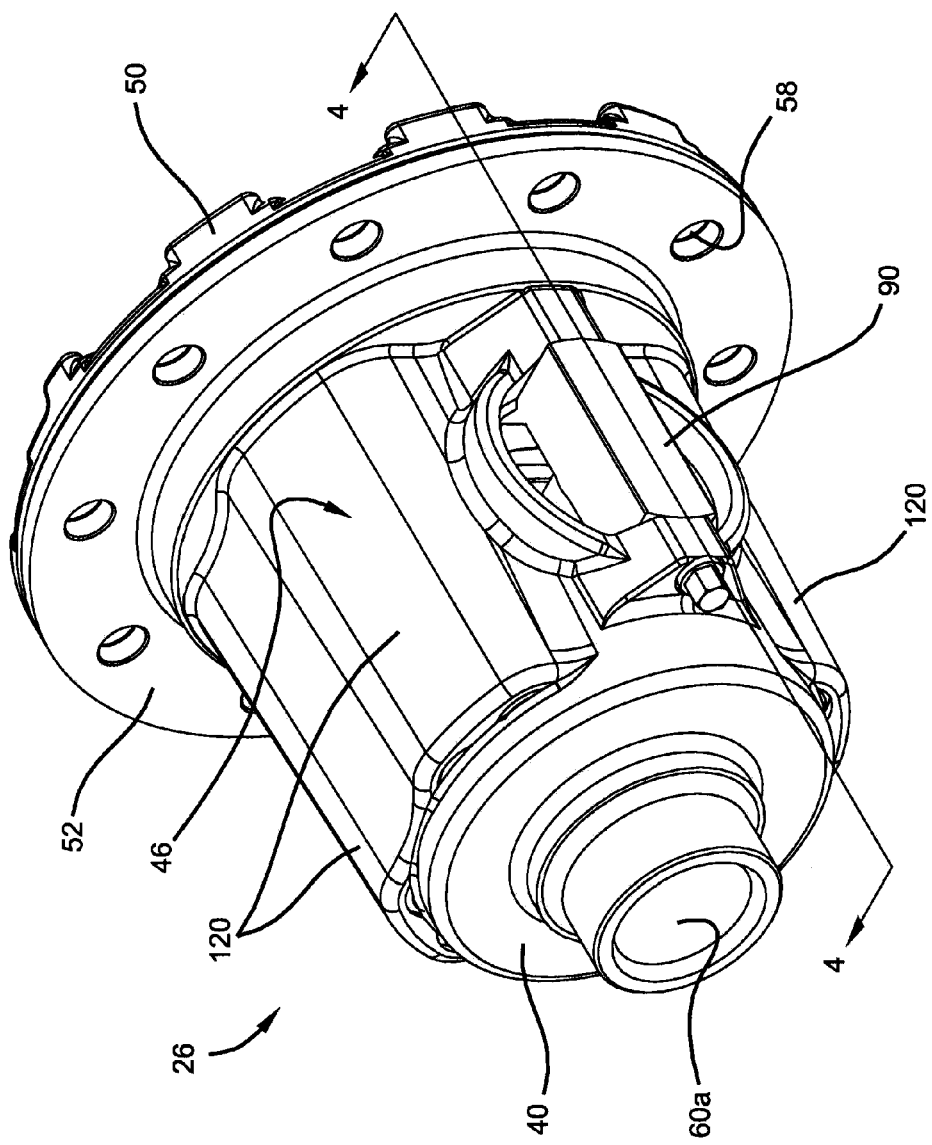
FIG. 2a is a perspective view of the differential assembly of FIG. 1.
Figure 2B:
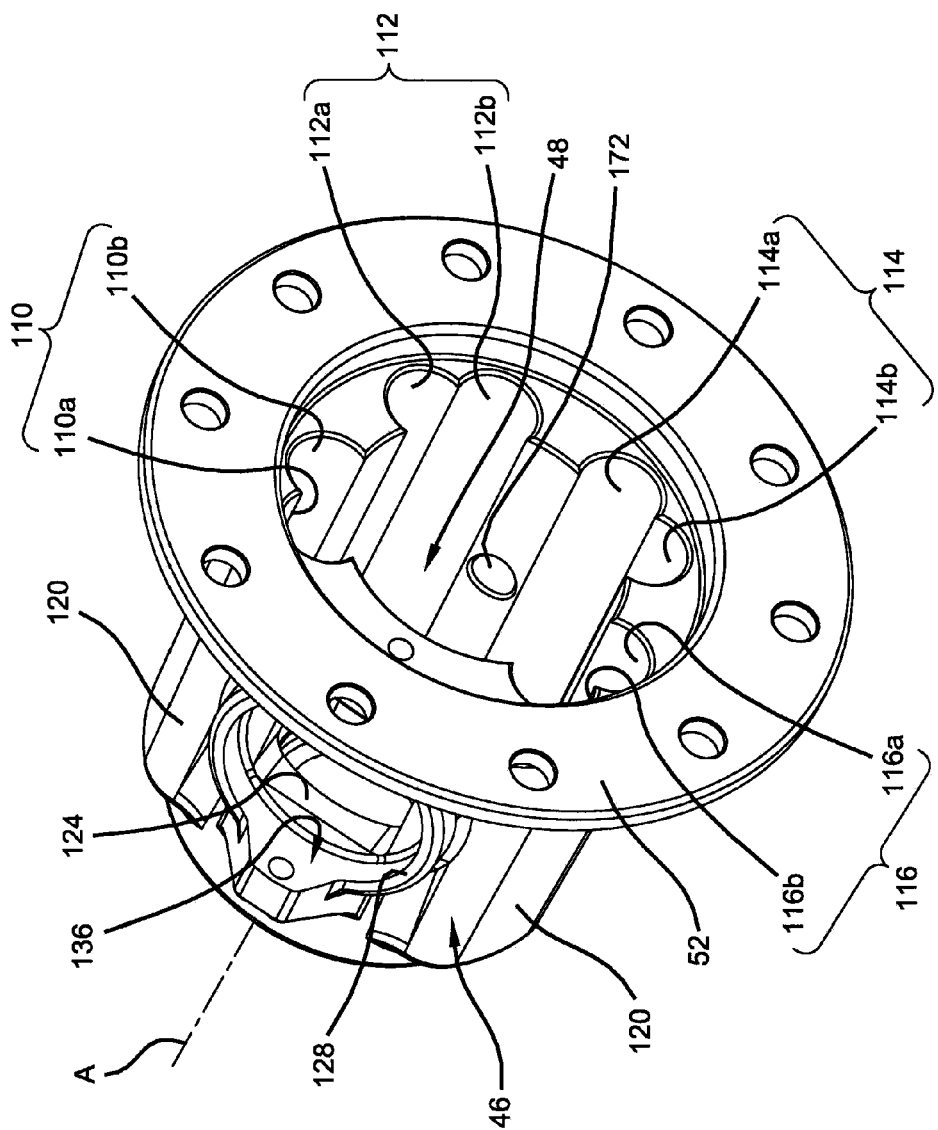

In FIGS. 2b and 3, the four sets of helical pinion pairs 100 through 106 are shown to be rotatably supported in complementary sets of cylindrical pinion bores 110a and 110b, 112a and 112b, 114a and 114b, and 116a and 116b. Pinion pairs 100 through 106 are also rotatably supported on arcuate scalloped segments 86' of spacer 86 which, in turn, function to inhibit rotation of spacer 86 relative to differential case 40. The complementary sets of pinion bores 110a and 110b, 112a and 112b, 114a and 114b, and 116a and 116b are hereinafter referred to as a first, second, third and fourth pair of pinion bores 110, 112, 114, and 116, respectively. Pinion bores 110 through 116 are formed in raised hub segments 120 of main body 46. Pinion bores 110 through 116 are arranged in paired sets such that they communicate with each other and with internal chamber 48. In addition, pinion bores 110 through 116 are aligned substantially parallel to the rotational axis A of axleshafts 44 and 45. A window opening 124 is formed through differential case 40 between the first and fourth pairs of pinion gears 100 and 106.

Figure 5:
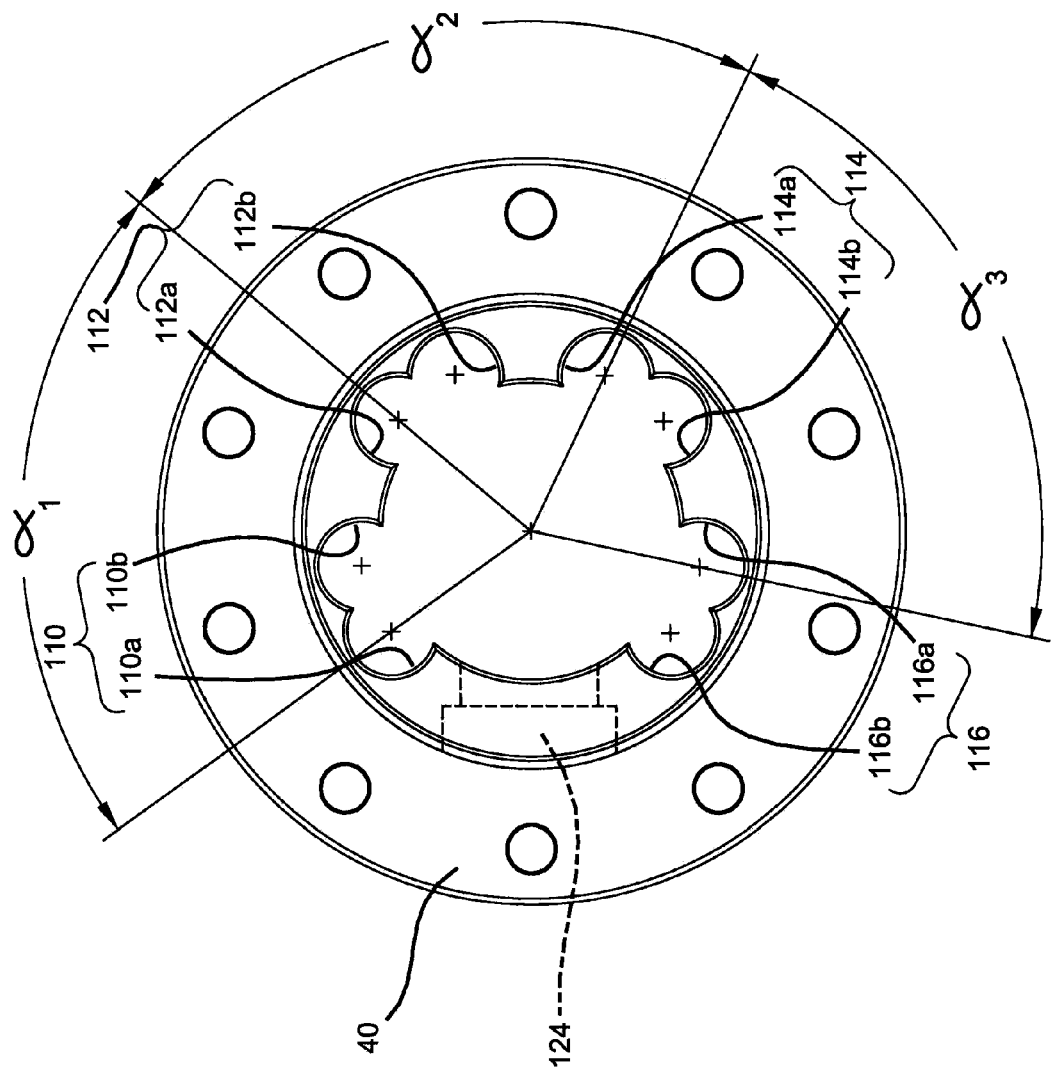
FIG. 5 is a sectional view of the differential assembly taken along line 5-5 of FIG. 4.

With reference now primarily to FIG. 5, a preferred spatial relationship for the four sets of pinion pairs will be described. The four sets of pinion bores 110 through 116, and as a result, the four pinion pairs 100 through 106 (FIG. 3), are radially spaced evenly around differential case 40 opposite window opening 124. More specifically, first pair of pinion bores 110 is offset a radial distance α1 from second pair of pinion bores 112. Second pair of pinion bores 112 is offset a radial distance α2 from third pair of pinion bores 114. Finally, third pair of pinion bores 114 is offset a radial distance α3 from fourth pair of pinion bores 116. As illustrated, the respective "α" distances are taken from the centerline of respective first bores 110a through 110d. The radial offsets between pinion bores 110 and 112, 112 and 114, and 114 and 116 may be approximately equivalent (e.g., α1=α2=α3). In the example provided, α1, α2 and α3 are approximately 75 degrees.

Figure 6:
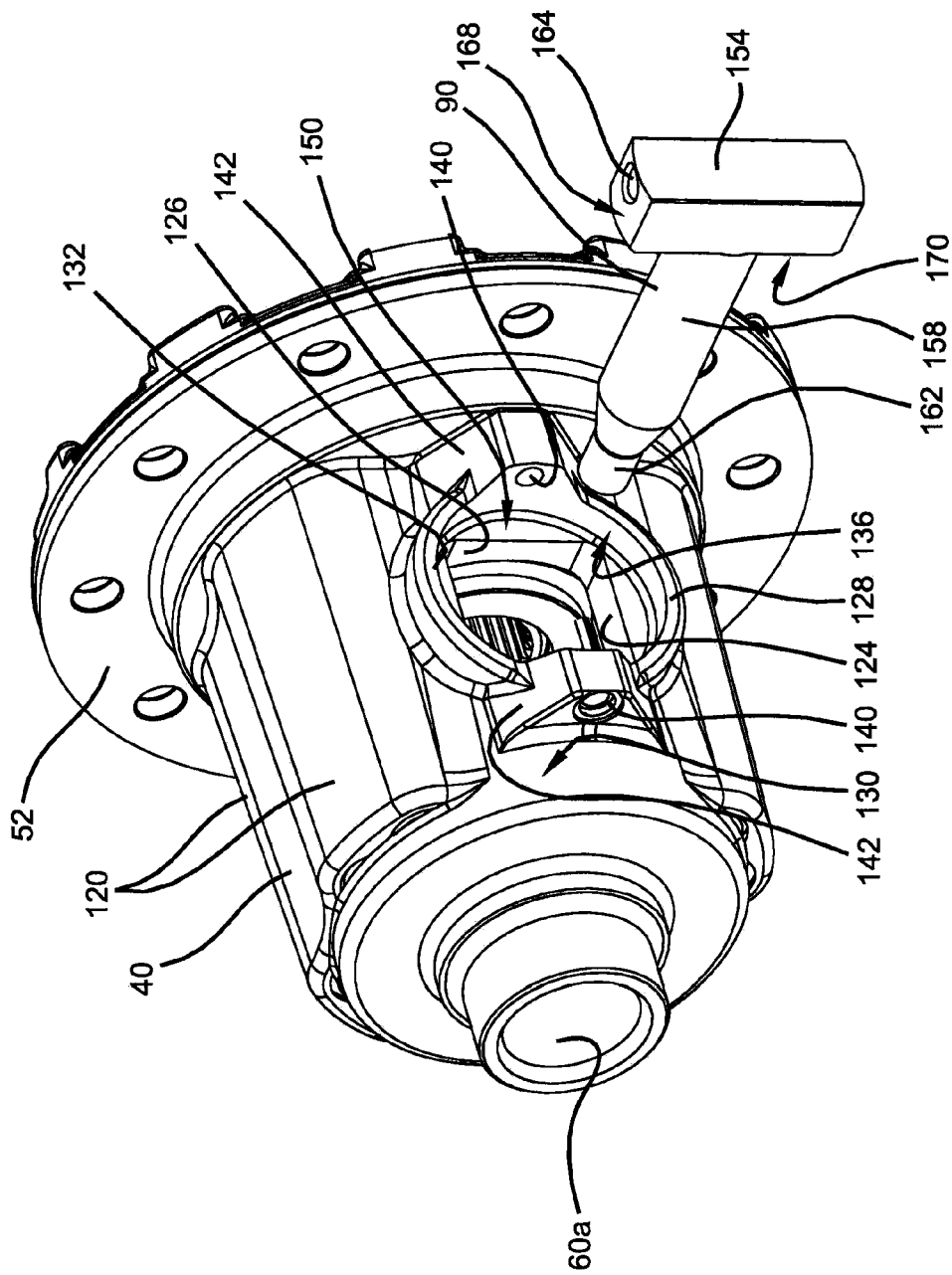
FIG. 6 is a perspective view of the differential assembly of FIG. 1 illustrating the cross pin of the spacer pin assembly in an exploded condition.

With specific reference now to FIGS. 2b, 4 and 6, the configuration of window opening 124 and its cooperation with cross pin 90 will be described. Window opening 124 includes an access passage 126 surrounded by a cylindrical boss 128 that is formed on an outer surface 130 of differential case 40. Cylindrical boss 128 defines a counterbore 132 having an inner radial engaging surface 136. Cylindrical boss 128 includes a pair of aligned mounting bores 140 formed on raised flanges 142 for receiving a fastener 146 (FIG. 8) therethrough. A ledge portion 150 extends at least partially about window opening 124 inwardly of cylindrical boss 128 on differential case 40.

Cross pin 90 generally includes a proximal head portion 154, an intermediate shank portion 158 and a distal end portion 162. Head portion 154 defines a body that extends generally transverse to longitudinal axis of cross pin 90. Head portion 154 includes a throughbore 164 for receiving fastener 146. Head portion 154 may include arcuate ends 168 that may be slidably disposed against inner radial engaging surface 136 of counterbore 132 during assembly. A bottom surface 170 of head portion 154 locates against ledge 150. Distal end portion 162 of cross pin 90 locates in a bore 172 formed in differential case 40.

Cross pin 90 may be unitarily formed or may comprise two or more components. In the example provided, cross pin 90 is a two-piece assembly comprising proximal head portion 154, which may be pressed onto a discrete shank that defines both intermediate shank portion 158 and distal end portion 162. It is appreciated that while distal end portion 162 of cross pin 90 is shown stepped down from intermediate shank portion 158, cross pin 90 may comprise a uniform outer diameter. For example, an alternate pinion gear arrangement may be employed with a differential assembly providing enough space to accommodate a cross pin defining a consistent outer diameter.

Figure 7:
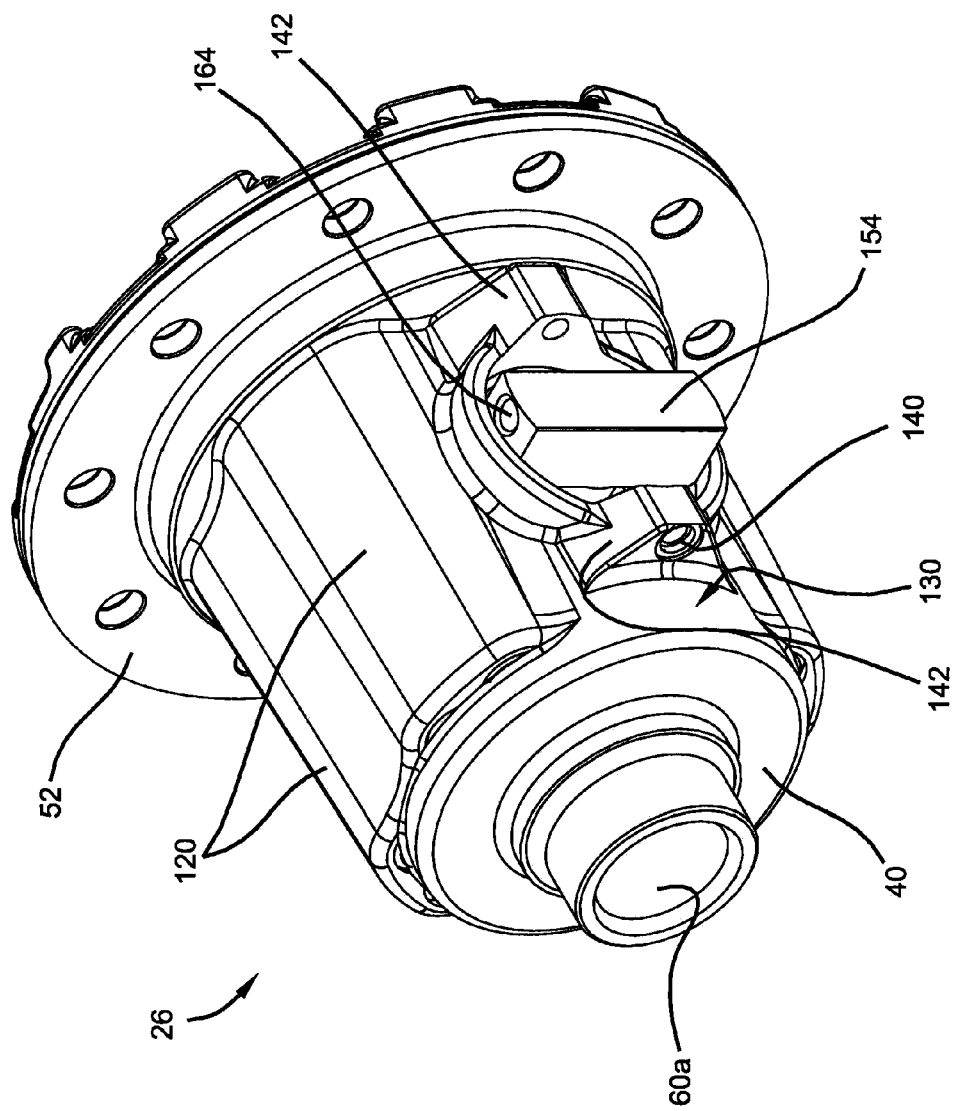
FIG. 7 is a perspective view of the differential assembly of FIG. 1 illustrating the cross pin of the spacer pin assembly engaged with the cylindrical boss of the differential case.

With reference to FIGS. 4 and 7, assembly of cross pin 90 into differential case 40 will now be described in greater detail. Once C-clips 94 are installed with spacer 86 located between side gears 66a and 66b, spacer aperture 92 is aligned opposite window opening 124 on differential case 40. Distal end 162 and intermediate portion 158 of cross pin 90 are inserted through window opening 124 and spacer aperture 92. Distal end 162 of cross pin 90 is located in bore 172 in differential case 40 opposite window opening 124. Bore 172 and counterbore 132 function to pilot cross pin 90 during installation. Proximal head portion 154 may be inserted in an orientation substantially transverse to the axis A of differential case 40. In this way, head portion 154 of cross pin 90 will not interfere with the adjacent ring gear 38 (FIG. 1) during installation.

Figure 8:
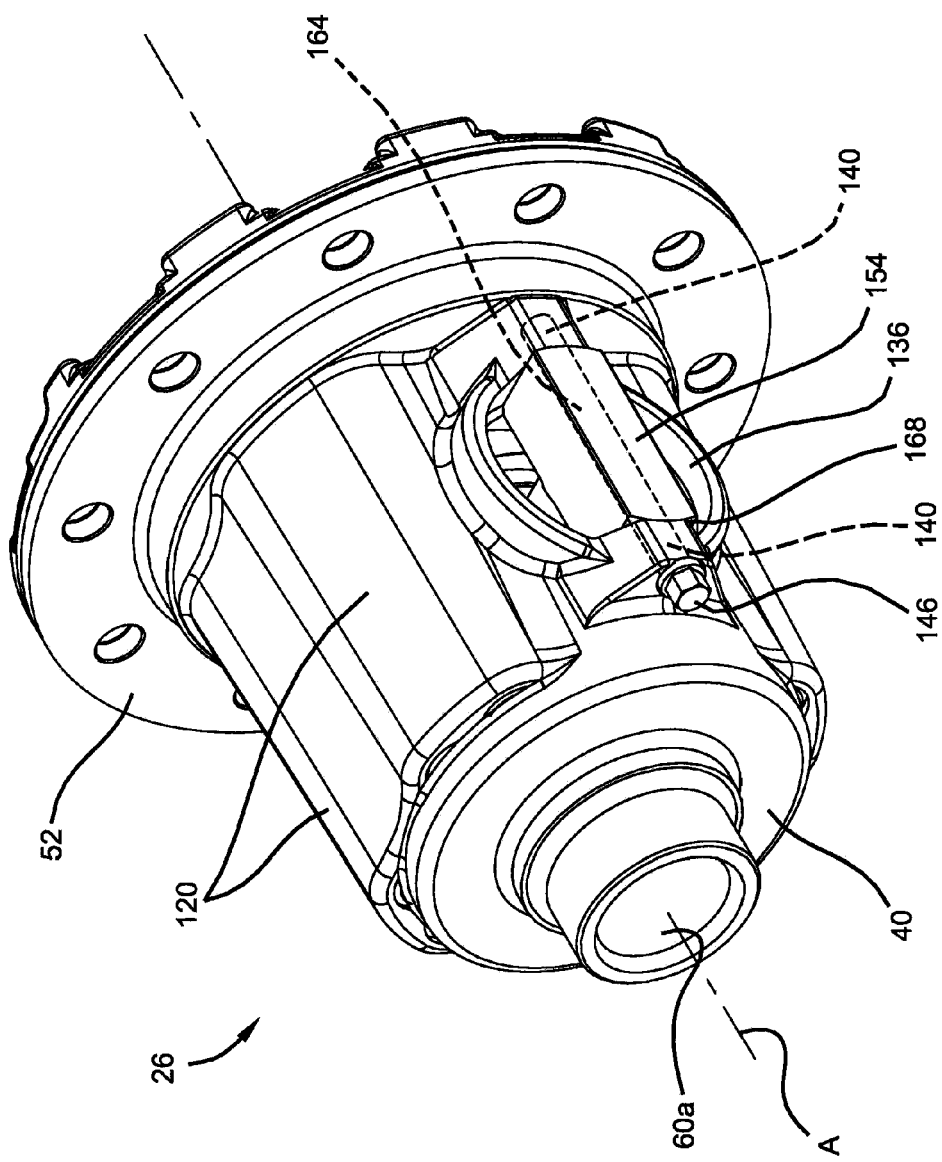
FIG. 8 is a perspective view of the differential assembly of FIG. 2a illustrating the cross pin of the spacer pin assembly in an installed condition.

As distal end 162 of cross pin 90 locates into bore 172, bottom surface 170 of head portion 154 engages ledge 150 between counterbore 132 and window opening 124. Similarly, arcuate ends 168 of proximal head 154 engage inner radial engaging surface 136 of counterbore 132. Proximal head portion 154 may then be rotated from the position shown in FIG. 7 into a substantially parallel orientation with the axis A of differential 26 as illustrated in FIG. 8 until throughbore 164 aligns with mounting bores 140 in raised flanges 142 on cylindrical boss 128. During rotation of proximal head portion 154, inner radial engaging surface 136 pilots arcuate ends 168 of proximal head portion 154. Concurrently, ledge 150 maintains cross pin 90 at proper depth and assures that throughbore 164 will be properly aligned with mounting bores 140 of raised flanges 142 on cylindrical boss 128.

Once throughbore 164 and mounting bores 140 are aligned to one another, fastener 146 is inserted and secured. With cross pin 90 thus installed, relative movement between cross pin 90 and differential case 40 is essentially inhibited. As a result, the endplay of the end segment of axleshafts 44 and 45 may be controlled within desirable tolerances as a function of the diameter of intermediate portion 158 of cross pin 90. Spacer 86, shown to have a U-shaped configuration, is disposed between side gears 68a and 68b and controls axial endplay of side gears 68a and 68b to keep differential assembly 26 from binding. Cross pin 90 does not engage spacer 86 in an assembled condition. Specifically, bore 92 in spacer 86 defines a greater diameter than the diameter of cross pin 90. In this way, two distinct components are used to control the side gear endplay (namely, spacer 86), and the axleshaft endplay (namely, cross pin 90). Such an arrangement allows for a desired amount of side gear endplay without affecting the axleshaft endplay.

The mass of differential assembly 26 may be distributed to provide rotational balance. Specifically, the mass of cylindrical boss 128 and cross pin head 154 cooperate with the mass of differential case 40 around pinion bores 110 through 116 and mass of the pinion gears 100 through 106 to provide a rotationally balanced differential assembly 26. Stated another way, the mass of the several components of differential assembly 26 is distributed about the rotational axis A so as to minimize or eliminate imbalance when the differential assembly 26 is rotated about the rotational axis A. It is appreciated that a counterweight may additionally, or alternatively be incorporated onto differential case 40 or end cap 50 of the differential assembly 26.

The fastener 146 may be configured the same as an open differential such that the same axle assembly lines may be ran with both open differentials and helical gear differentials without changing tooling or torque wrench settings.

Figure 9:
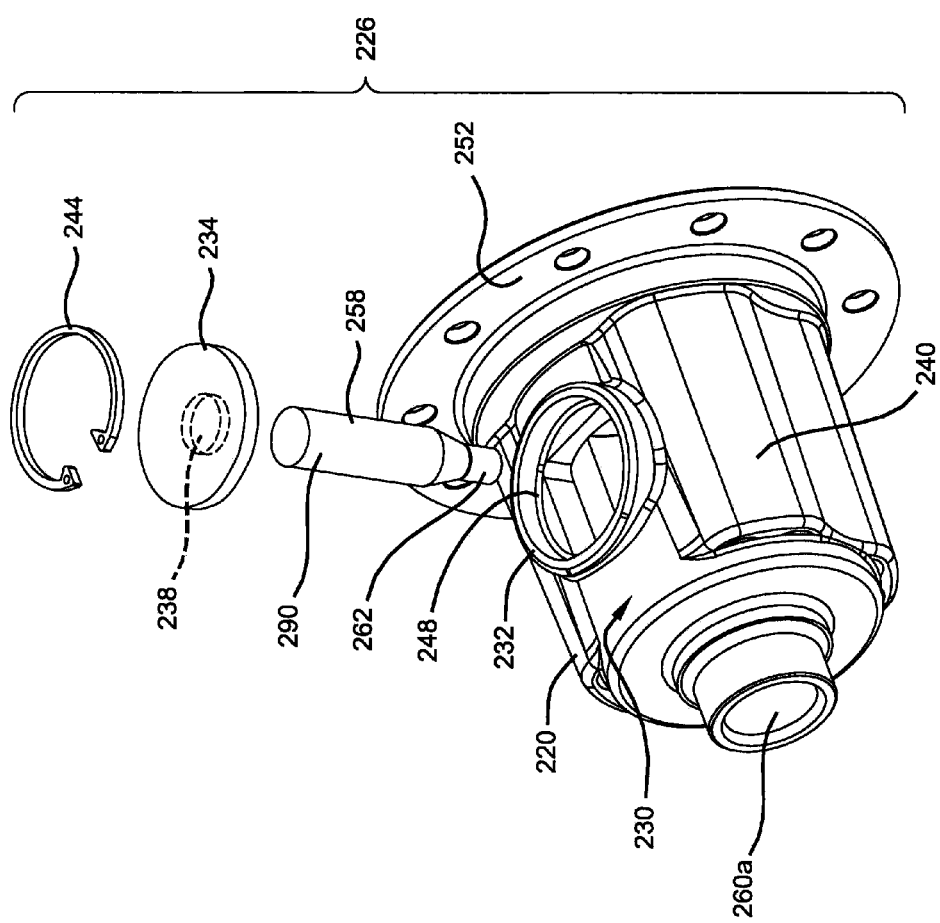
FIG. 9 is an exploded view of a differential assembly equipped with a spacer pin assembly constructed according to an alternative embodiment.

Turning now to FIG. 9, a differential assembly 226 according to an alternative embodiment is shown. Differential assembly 226 incorporates many components similar to differential assembly 26, with such components identified with a 200 prefix. Differential assembly 226 includes a cross pin 290 having an intermediate shank portion 258 and a distal end portion 262. Distal end portion 262 of cross pin 290 is adapted to pass through aperture 92 in spacer 86 for retention in bore 172 in differential case 240. Cross pin 290 may be adapted to be retained in differential case 240 by a retaining disk 234. Specifically, the proximal end of cross pin 290 is adapted to seat into a counterbore 238 formed on an inboard surface of retaining disk 234. A retaining ring 244 is adapted to seat into a radial lip or groove 248 arranged in counterbore 232 to removeably secure cross pin 290 and disk 234 to differential case 290.

Figure 10:
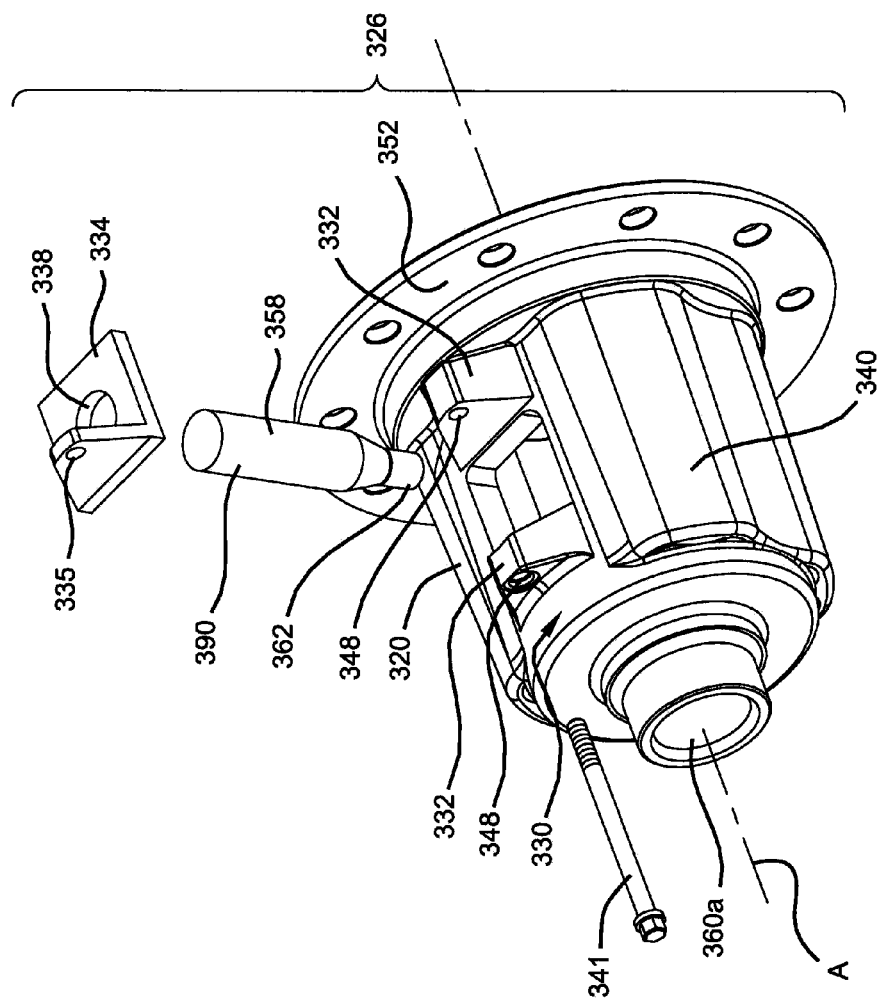
FIG. 10 is an exploded view of a differential assembly equipped with a spacer pin assembly constructed according to another alternative embodiment.

With reference now to FIG. 10, a differential assembly 326 according to another alternative embodiment is shown. Differential assembly 326 also incorporates similar components to differential assembly 26, with such components identified with a 300 prefix. Differential assembly 326 includes a cross pin 390 having an intermediate shank portion 358 and a distal end portion 362. Cross pin 390 is adapted to be retained in differential case 340 by a L-plate 334 and a fastener 341. Specifically, a proximal end of cross pin 390 is adapted to pass through an opening 338 formed in L-plate 334. In this way, L-plate 334 cooperates with cross pin 390 to maintain cross pin 390 in a substantially perpendicular orientation with axis A. Fastener 341 may be adapted to be secured through bores 348 incorporated in flange portions 332 and a passage 335 formed in L-plate 334. As a result, in an installed position, fastener 341 bounds the proximal end of cross pin 390 and maintains cross pin 390 in an installed position.

Figure 11:
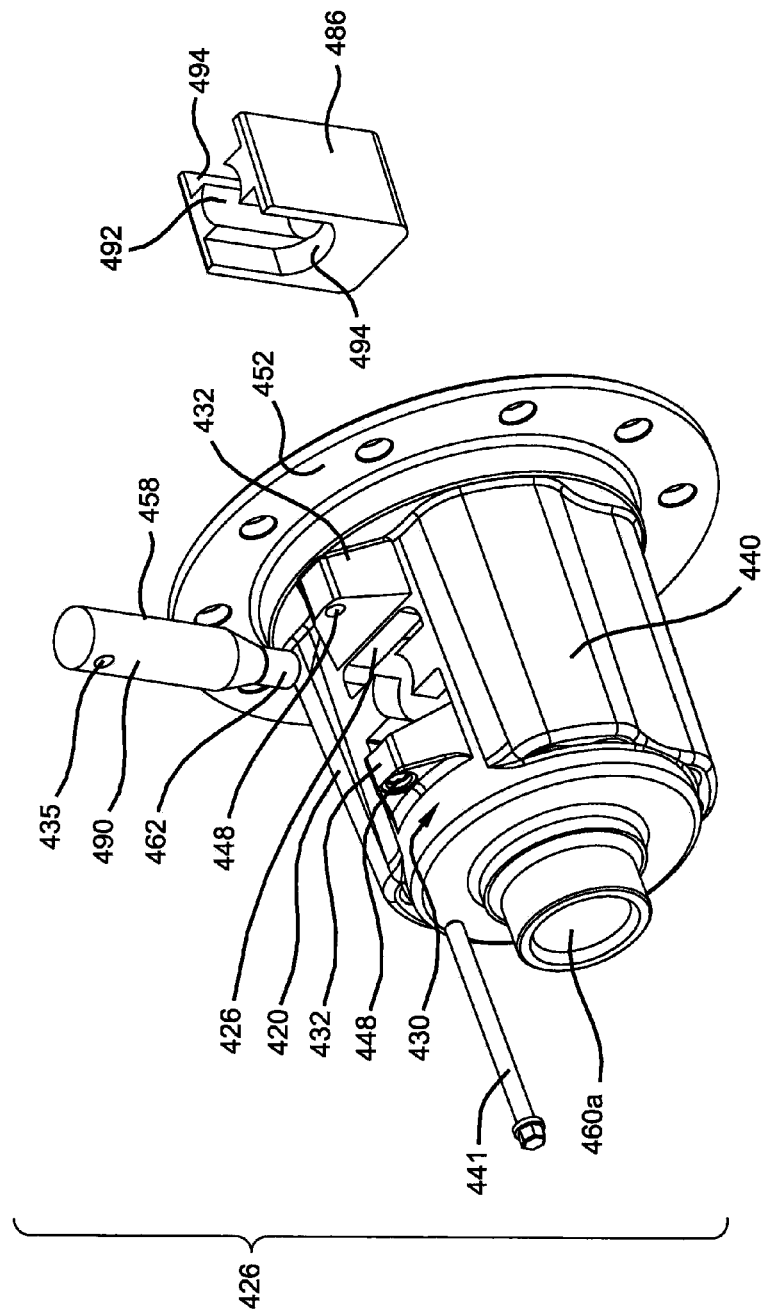
FIG. 11 is an exploded view of the differential assembly equipped with a spacer pin assembly constructed according to yet another alternative embodiment.

With reference now to FIG. 11, a differential assembly 426 according to yet another alternative embodiment is shown. Differential assembly 426 also incorporates many components that one similar to differential assembly 26, with such components identified with a 400 prefix. Differential assembly 426 includes a cross pin 490 having an intermediate shank portion 458 and a distal end portion 462. Distal end portion 462 of cross pin 490 is adapted to pass through aperture 92 in spacer 86 for retention in bore 172 formed in differential case 440. Cross pin 490 is removeably retained in differential casing 440 by a fastener 441. Specifically, fastener 441 is adapted to be secured through passages 448 incorporated in flange portions 432 and a bore 435 formed in cross pin 490.

A pair of access passages 426 are incorporated in differential casing 440 and define an access for installing C-clips 92 (FIG. 3). A spacer 486 according to additional features includes a passage 492 for accepting cross pin 490 therethrough in an assembled position. Spacer 486 is adapted to be installed into differential casing 440 axially between side gears as described herein. Spacer 486 includes U-shaped channels 494 that are alignable with passages 492 to accept C-clips 92 therein.

Figure 12:
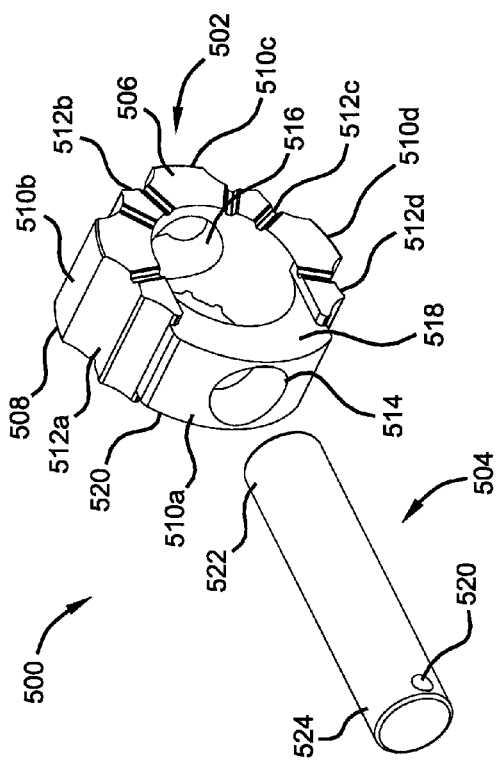
FIGS. 12 and 13 illustrate alternative versions of a spacer pin assembly adapted for use in the differential assembly pursuant to the present invention.
Figure 13:
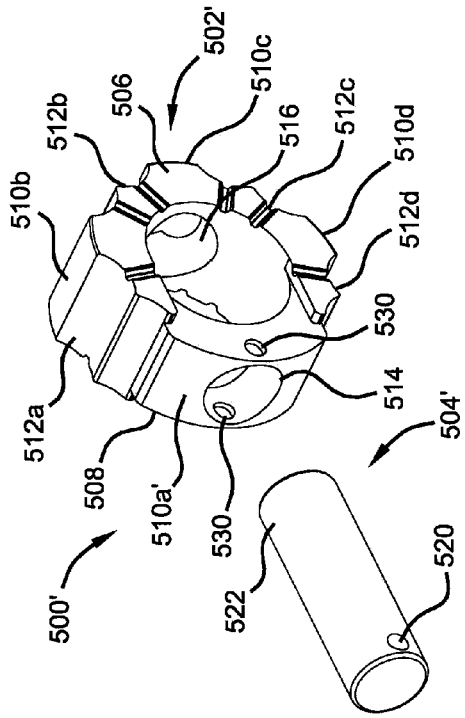

Each of the spacer pin assemblies discussed above functions to transfer side gear thrust loads through the spacer instead of through the cross pin so as to avoid excessive loading on the C-clip retainers. However, care must be taken to ensure that the side gear thrust loads are not absorbed by the C-clips. Thus, it is preferable that the side gears engage the spacer before the ends of the axleshafts contact the cross pin. In terms of tolerance stack-ups, it is beneficial to have the side gear spacer function and axleshaft spacer function integrated into a common component or simplified assembly. Accordingly, FIGS. 12 and 13 illustrate alternative space pin assemblies that are applicable for use in differential assembly 26 (FIGS. 2 through 8), differential assembly 226 (FIG. 9), differential assembly 326 (FIG. 10) and differential assembly 426 (FIG. 11). However, for purposes of clarity, these alternative spacer pin assemblies will be described in combination with differential assembly 26.

Referring initially to FIG. 12, a spacer pin assembly 500 is shown to include a spacer ring 502 and a cross pin 504. Spacer ring 502 is adapted to be installed within internal chamber 48 of any of the above-referenced differential assemblies between side gears 68a and 68b. Spacer ring 502 includes a first end face surface 506 adapted to be aligned in proximity to an inner face surface of side gear 68a and a second end face surface 508 adapted to be aligned in proximity to an inner face surface of side gear 68b. Spacer ring 502 further includes a circular outer surface defining four arcuate sections 510a through 510d which are delimited by scalloped sections 512a through 512d which align with the paired sets of pinion bores 110 through 116 to inhibit rotation of spacer ring 502 within body 46 of differential case 40. A pair of polar apertures 514 and 516 are formed to extend through arcuate sections 510a and 510c, respectively, and are sized to receive cross pin 504 therein upon assembly of spacer assembly 500. In particular, spacer ring 502 is adapted for installation within chamber 48 of differential case 40 such that arcuate section 510a is aligned with window opening 124. As seen, end face surfaces 506 and 508 of spacer ring 502 are laterally recessed adjacent to arcuate section 510a to define a pair of U-shaped channels 518 and 520 which are sized to permit installation of C-clips 94 through window 124.

Cross pin 504 is a cylindrical component having a mounting bore 520 that is adapted to receive a fastener for removeably securing cross pin 504 to differential case 40. Upon assembly, spacer ring 502 is disposed with chamber 48 of differential case 40 such that cross pin 504 is installed through access window 124 in differential case 40 and passes through polar apertures 514 and 516 in spacer ring 502. A first end 522 of cross pin 504 is located in bore 172 of differential case 40 while its opposite end 524 extends into window 124.

Thereafter, mounting bore 520 is aligned with mounting bores in the differential case. Assuming spacer pin assembly 500 is used with differential assembly 26, mounting bore 520 in cross pin 504 is aligned with bores 140 in flanges 142 on boss 128 of differential case 40 and fastener 146 is thereafter installed into the aligned bores. However, since cross pin 504 does not include a head portion similar to that associated with cross pin 90 of FIGS. 2 through 8, it is contemplated that window opening 124 could be of reduced size or simply replaced with a window configuration similar to the window shown in FIG. 11 for differential assembly 426. Furthermore, it is contemplated that a threaded fastener 146, 341 or 441 could be replaced with a press-fit roll-pin for removeably securing cross pin 504 to case 40. Finally, it is again reiterated that the retaining disk type cross pin retention system used in association with differential assembly 226 of FIG. 9, the L-plate cross pin retention system used in association with differential assembly 326 of FIG. 10, and the guided retention system associated with differential assembly 426 of FIG. 11 can be used with spacer pin assembly 500. In each case, the width of spacer ring 502 is selected to ensure side gear engagement prior to axleshaft contact with cross pin 504.

As a substitute for spacer pin assembly 500 shown in FIG. 12, an alternative arrangement is shown in FIG. 13 and identified by reference number 500'. Spacer pin assembly 500' is generally similar to spacer pin assembly 500 except that cross pin 504' is shorter in length such that its mounting bore 520 is now alignable with a pair of mounting holes 530 formed through arcuate section 510a' of spacer ring 502'. As such, cross pin 504' is removeably secured to spacer ring 502' via insertion of a removeable fastener, such as a lock pin, into aligned bore 520' and holes 530. With such an arrangement, the size and function of window 124 in differential case 40 can be revised to accommodate installation and removal of C-clips 94.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A differential assembly, comprising:
    a case having first and second case apertures communicating with an internal chamber;
    a pair of output shafts having end segments disposed within said chamber;
    a gearset disposed in said chamber for transmitting drive power from said case to said output shafts while permitting speed differentiation therebetween and including a pair of laterally-spaced side gears coupled to said end segments of said output shafts;
    a spacer pin assembly having a spacer ring, a cross pin and a fastener, said spacer ring is disposed in said chamber between said side gears and has first and second spacer apertures alignable with said first and second case apertures, said cross pin is disposed within said aligned first and second case apertures and said first and second spacer apertures, and wherein said fastener secures said cross pin to said case;
    wherein said first case aperture in said case defines a window opening that is sized to permit insertion of C-clip retainers into said internal chamber for securing said output shafts to said side gears; and
    wherein said spacer ring includes channels adapted to surround said C-clips.

2. The differential assembly of claim 1 wherein said case defines elongated bores, and wherein said gearset further includes pinion gears each meshed with at least one of said side gears which are rotatably supported in said bores so as to generally surround said spacer ring.

3. The differential assembly of claim 2 wherein said spacer ring has scalloped outer surface portions alignable with said bores to support said pinion gears.

4. A differential assembly, comprising:
    a case having first and second case apertures communicating with an internal chamber;
    a pair of output shafts having end segments disposed within said chamber;
    a gearset disposed in said chamber for transmitting drive power from said case to said output shafts while permitting speed differentiation therebetween and including a pair of laterally-spaced side gears coupled to said end segments of said output shafts; and
    a spacer pin assembly having a spacer ring, a cross pin and a fastener, said spacer ring is disposed in said chamber between said side gears and has first and second spacer apertures alignable with said first and second case apertures, said cross pin is disposed within said aligned first and second case apertures and first and second spacer apertures, and wherein said fastener secures said cross pin to said spacer ring.

5. The differential assembly of claim 4 wherein said first case aperture in said case defines a window opening sized to permit insertion of C-clip retainers into said internal chamber for securing said output shafts to said side gears.

6. The differential assembly of claim 5 wherein said spacer ring includes channels adapted to surround said C-clips.

7. The differential assembly of claim 4 wherein said case defines elongated bores, and wherein said gearset further includes pinion gears each meshed with at least one of said side gears which are rotatably supported in said bores so as to generally surround said spacer ring.

8. The differential assembly of claim 7 wherein said spacer ring has scalloped outer surface portions alignable with said bores to support said pinion gears.

* * * * *